United States Patent Office 3,359,499
Patented Dec. 19, 1967

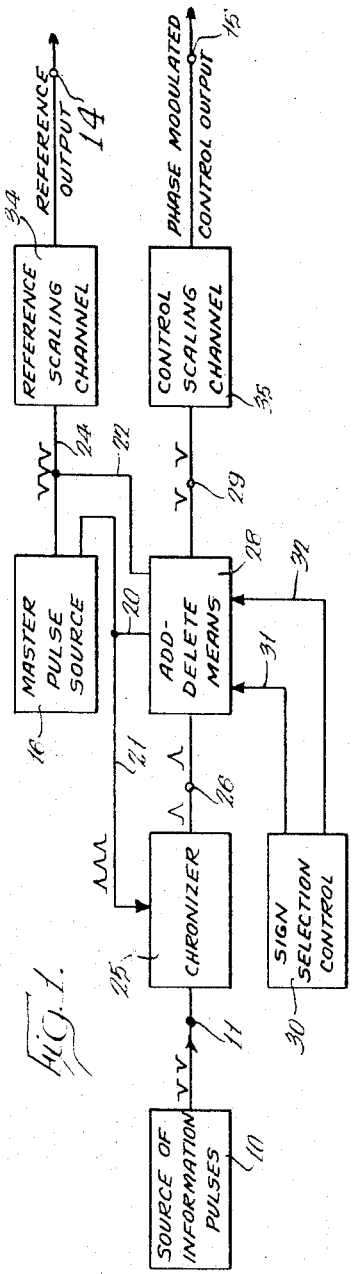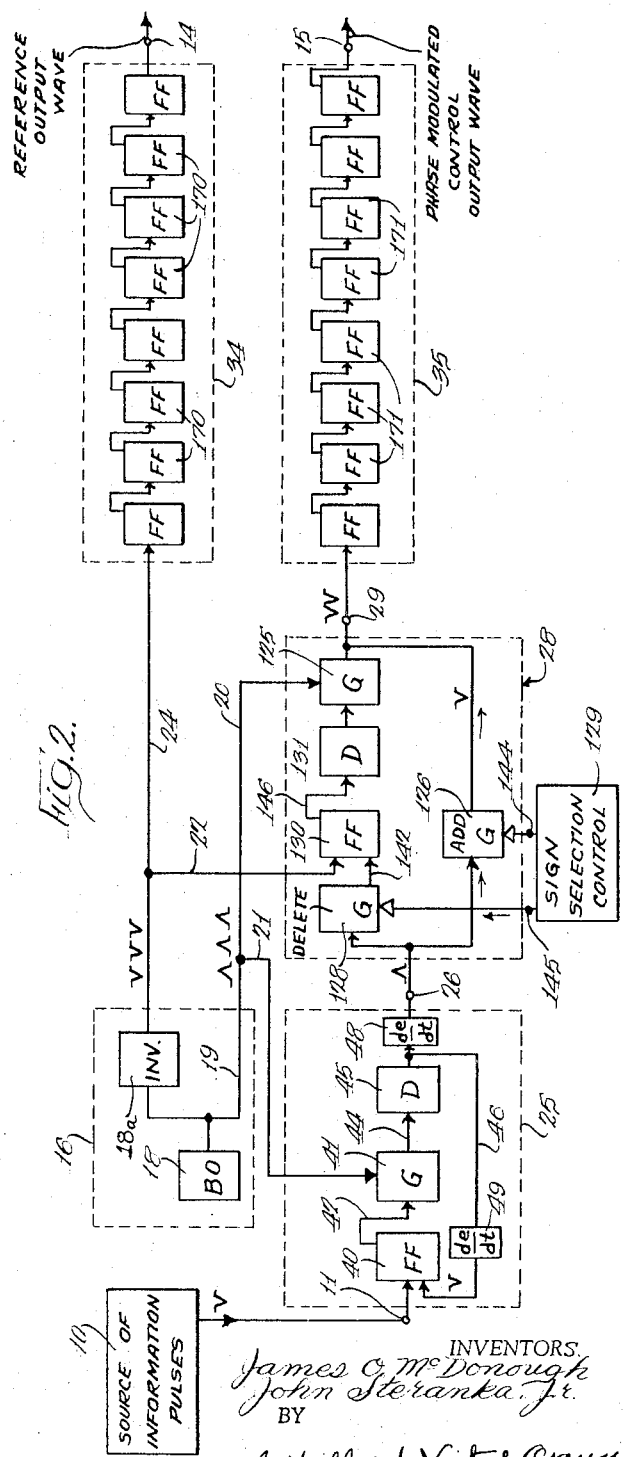

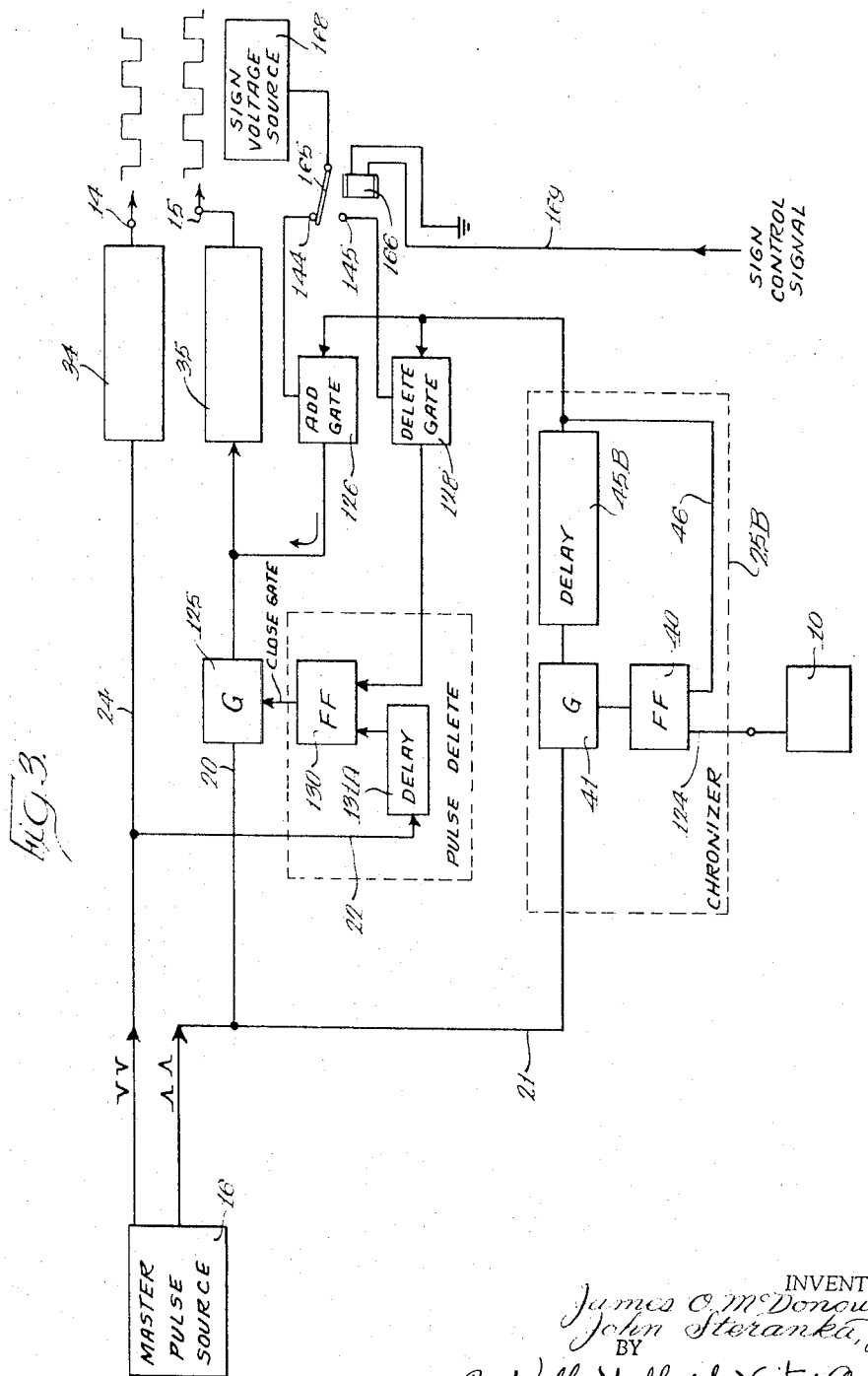

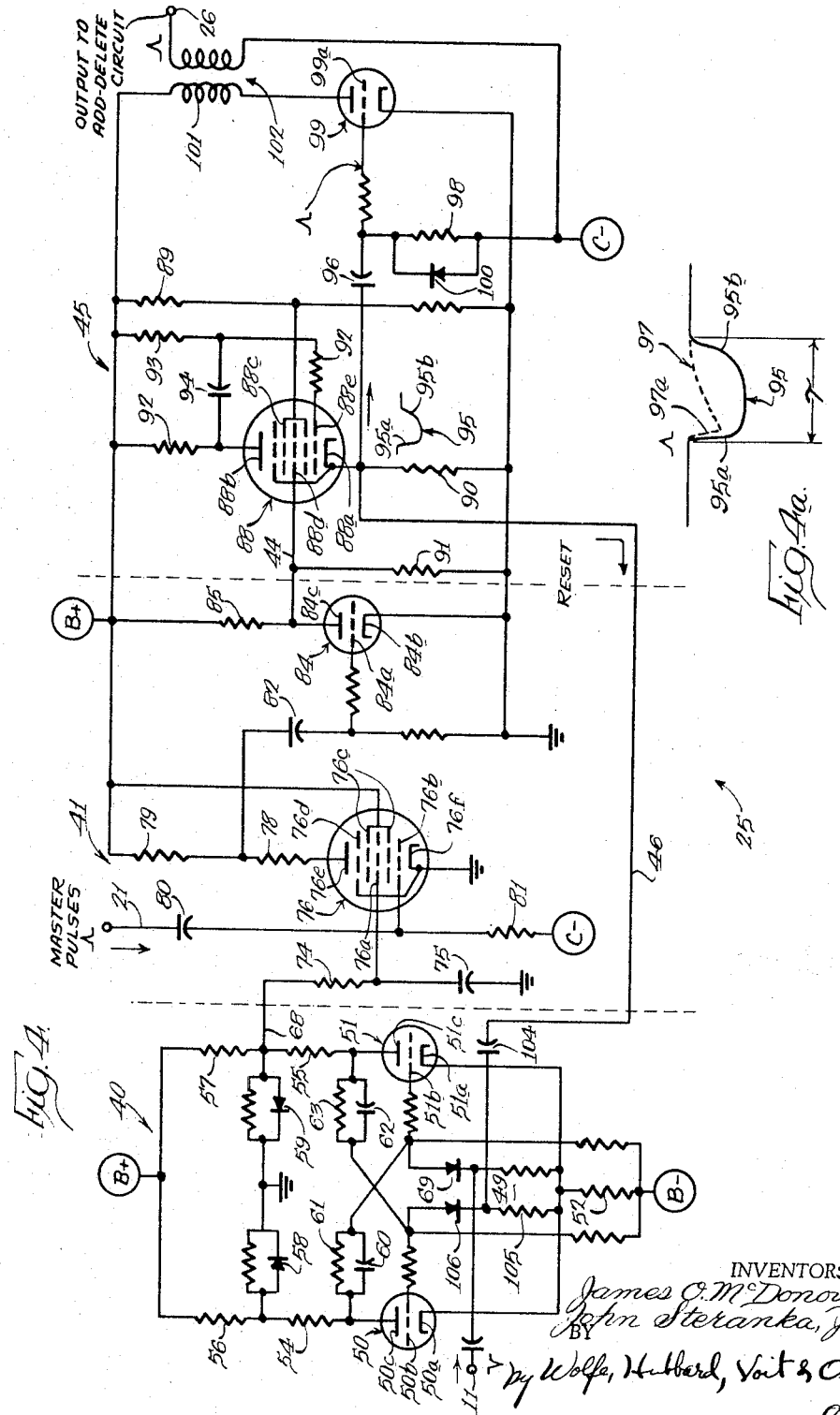

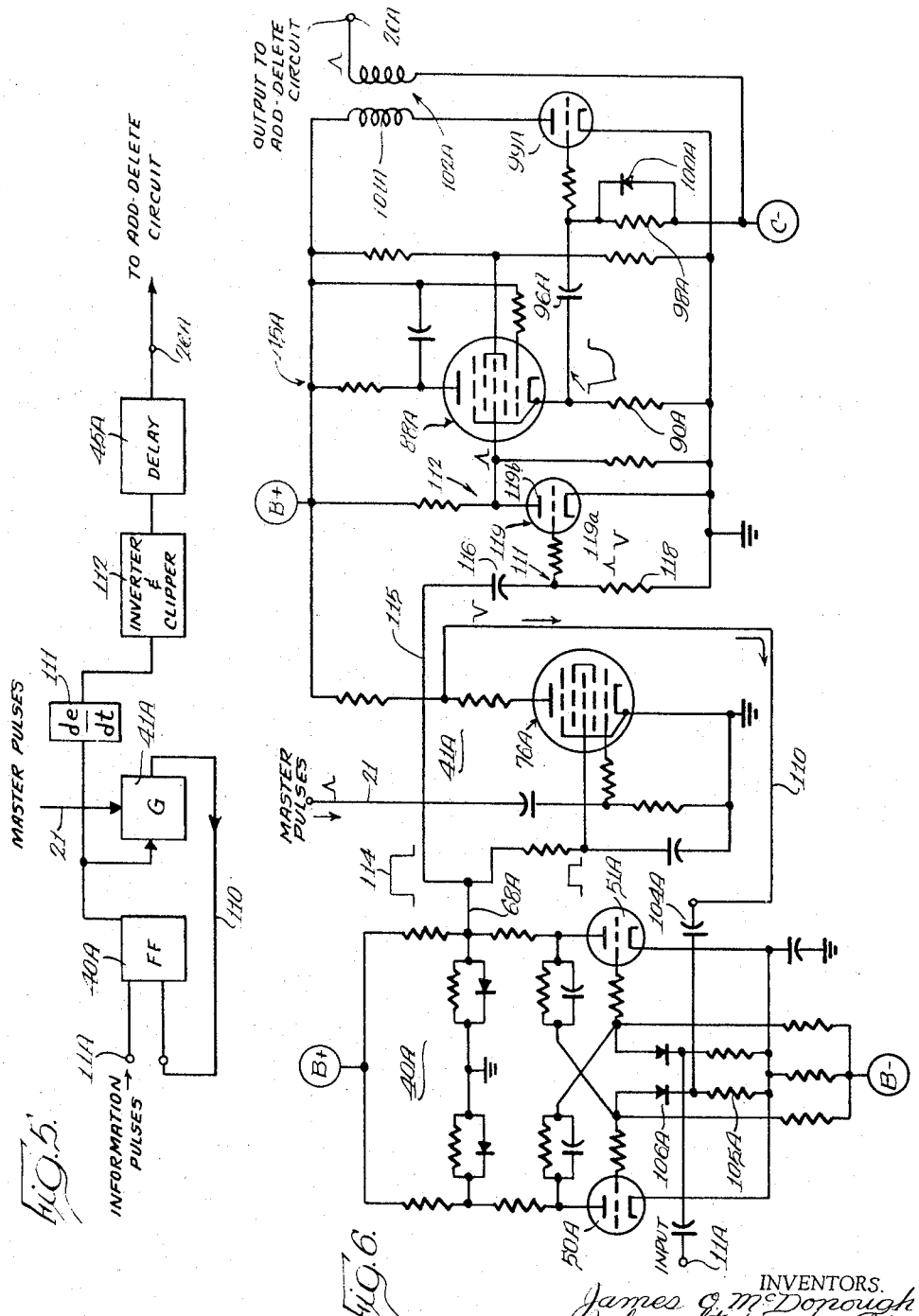

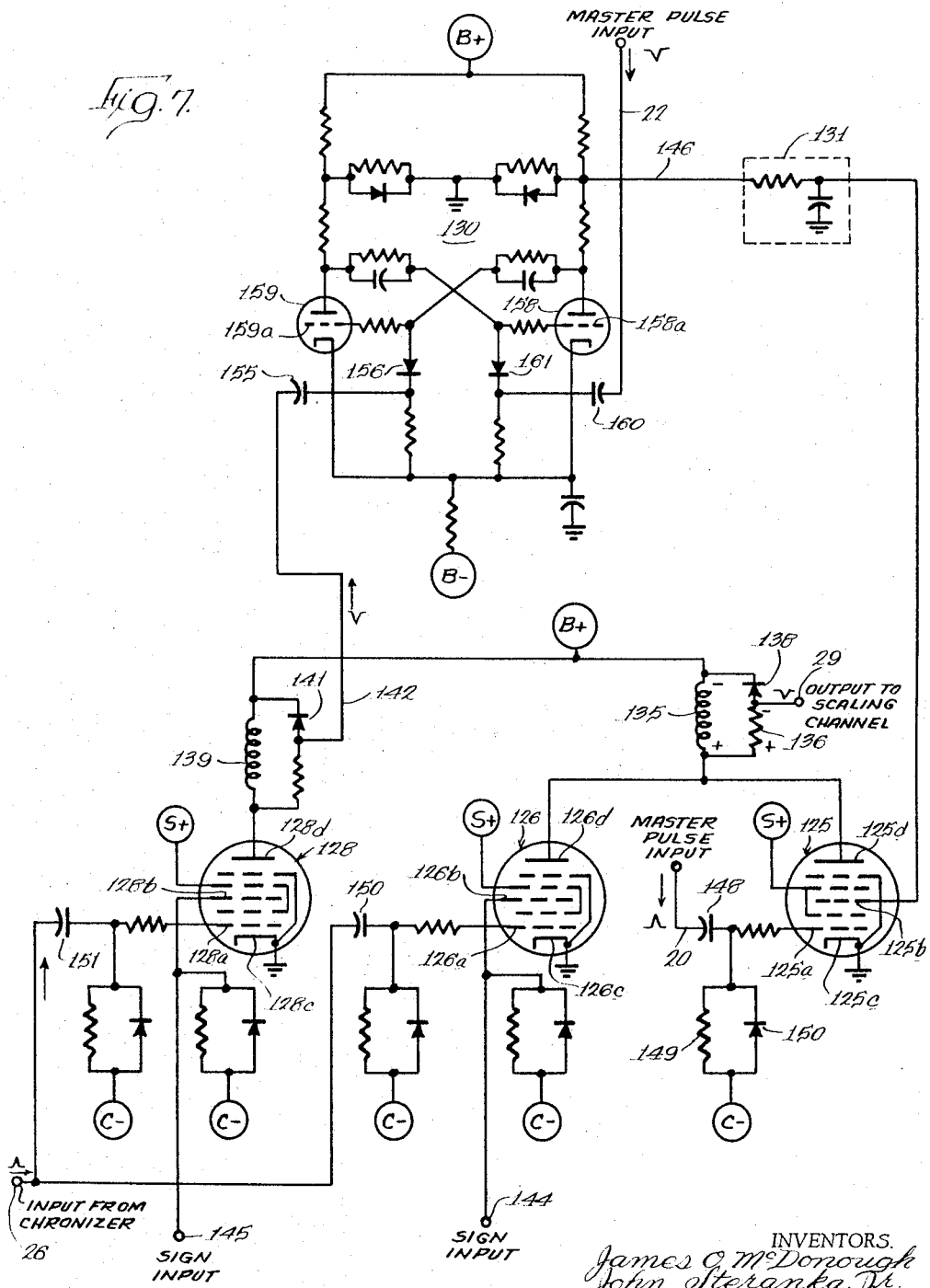

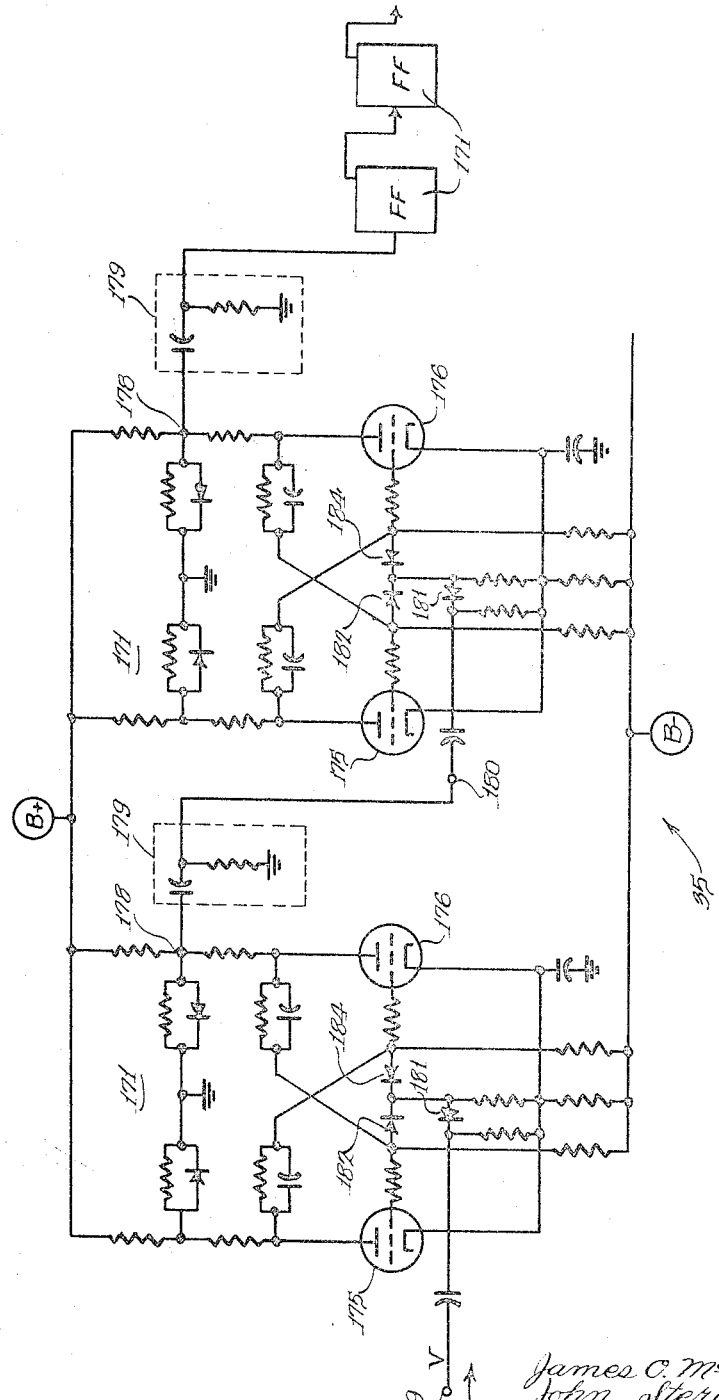

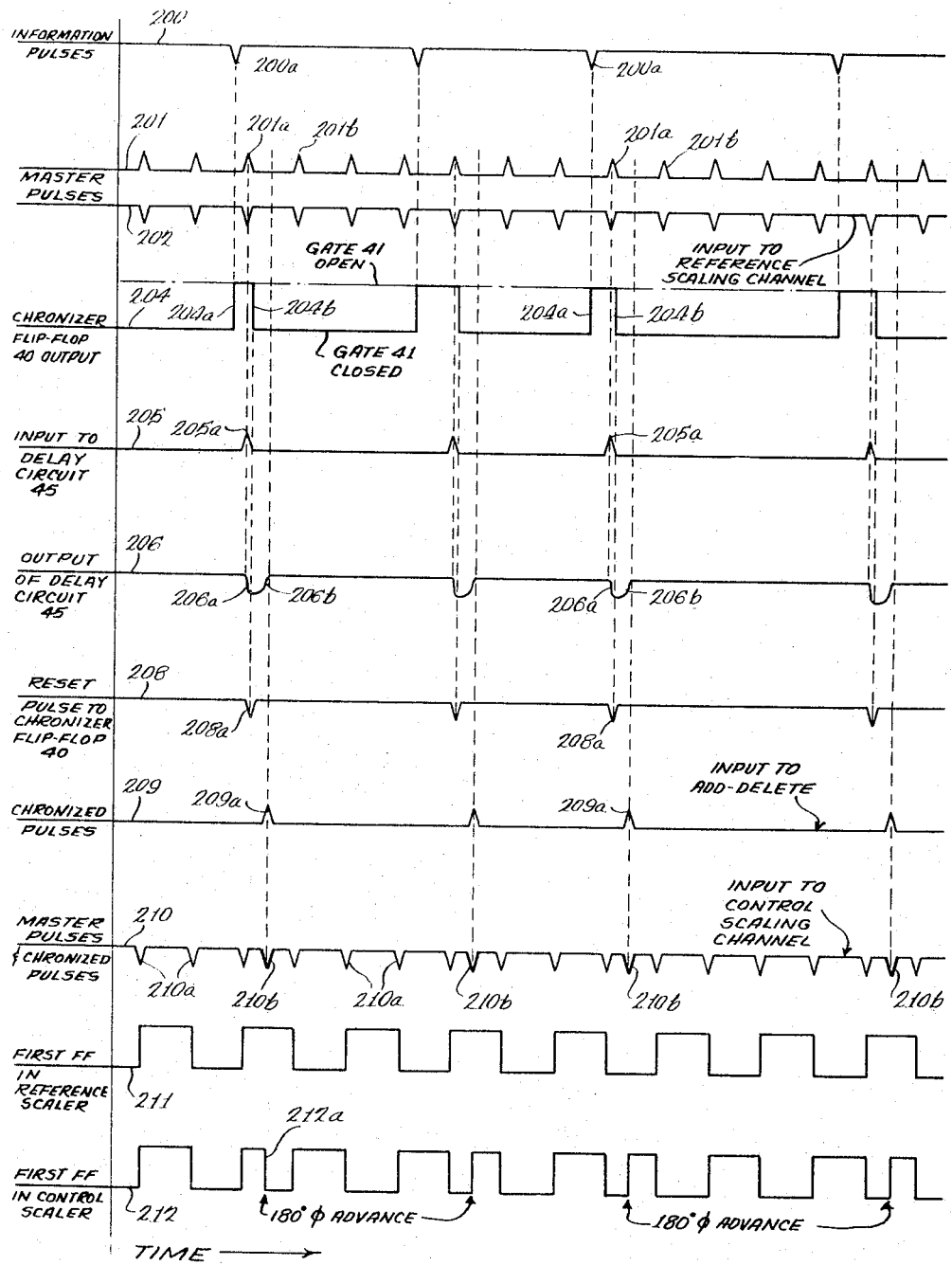

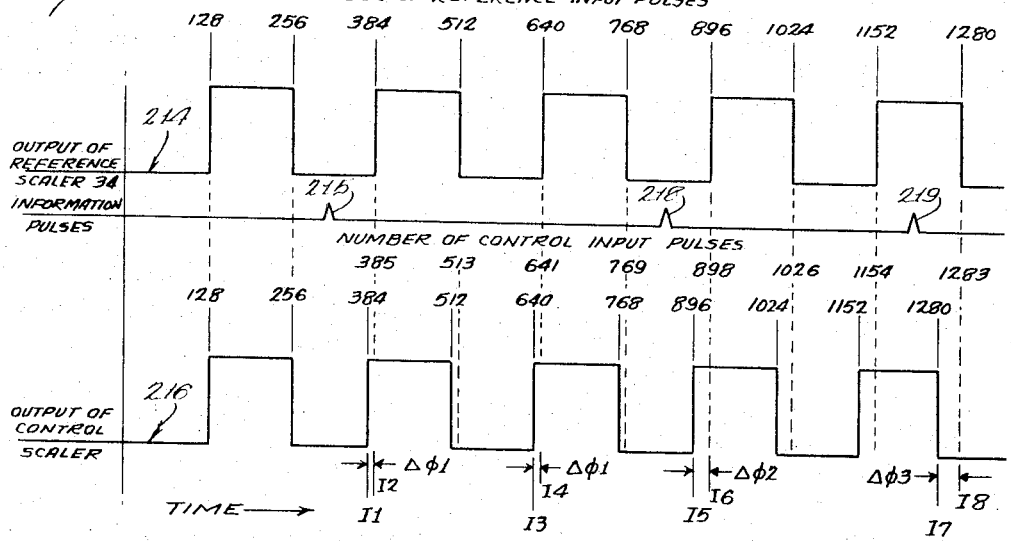
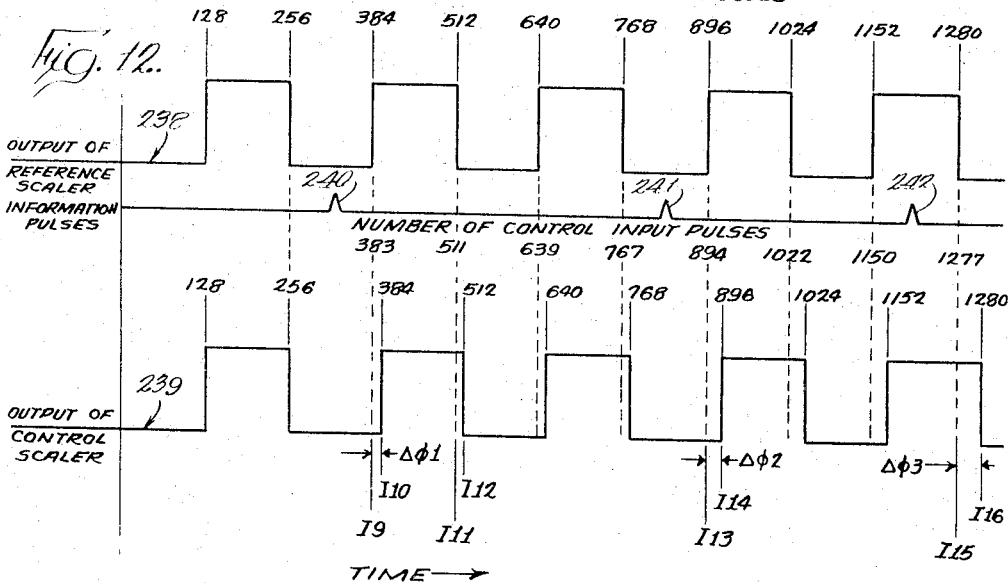

3,359,499
APPARATUS FOR RENDERING PULSE TRAINS NON-COINCIDENT AND ALGEBRAICALLY COMBINING THEM
James O. McDonough, Concord, Mass., and John Steranka, Jr., Van Nuys, Calif., assignors to Giddings & Lewis Machine Tool Company, Fond du Lac, Wis., a corporation of Wisconsin
Original application Oct. 24, 1957, Ser. No. 692,168, now Patent No. 3,258,667, dated June 28, 1966. Divided and this application Oct. 8, 1965, Ser. No. 505,222
12 Claims. (Cl. 328—157)

ABSTRACT OF THE DISCLOSURE

A phase shift decoder in which digital intelligence in the form of discrete signals or electrical pulses is converted into analog variations in the form of a changeable or variable phase between two recurring waves. The decoder may accept randomly occurring time-space input pulses and create corresponding variations in the phase of the output waves from reference and information scaling channels having the same scaling ratio and normally receiving as inputs the same recurring master signals. The input pulses cause the response of the information channel to the master signals to be selectively increased or decreased, thereby slightly to advance or retard the phase of the information channel output wave, relative to the output wave of the reference channel. The system disclosed insures that the randomly occurring information pulses are converted into pulses which are non-coincident with the master signals; and it acts to combine the master and information pulses into a stream which contains one more or one less pulse than the master pulses for each information pulse. It is to these latter aspects of what are called the "chronizer" and the "add-delete means" that this divisional application is directed, although the disclosure in the present case is substantially identical to that of the parent application identified below.

This application is a division of copending application Ser. No. 692,168, filed Oct. 24, 1957 (and issued on June 28, 1966 as U.S. Patent 3,258,667), such copending application being a continuation-in-part of the now-abandoned application Ser. No. 517,566, filed June 23, 1955.

The present invention relates in general to decoders, i.e., apparatus for converting information from digital form into corresponding intelligence of analogue form. In particular, this invention pertains to decoders of the type which convert information in the digital form of successively occurring discrete signals into an analogue, or quantized analogue, phase variation.

A digital representation of symbols, numbers or numerical values is abstract. It has no physical form of variation which can be measured, that is, it has no dimension denoting a physical quantity or amount. Numbers may be represented in digital form to any desired accuracy by choosing correspondingly small increments and adding together or summing the necessary quantity of those increments. For example, the number 23.4560 may be viewed as 23,456 increments if the increment chosen is assigned a value of .001. To represent that information digitally, 23,456 discrete signals could be generated over a period of time. To find the value represented by those signals they would have to be counted or summed; they could not be measured.

Analogue variations are not abstract, but are real and physical in that they are susceptible of measurement, and inherently include dimensions as well as magnitude. For example, the distance a movable element traverses, the velocity at which it travels, and the acceleration which it undergoes are all physical variations which can be measured. If it is desired to control a movable element such as an electric motor so that the total angle through which it rotates, the speed at which it rotates and the acceleration which it undergoes have certain desired variations with time, an analogue control signal may be created in which the change in magnitude of the signal corresponds to the total rotation, the rate of change of the signal corresponds to the motor velocity, and the second derivative of the signal with respect to time corresponds to acceleration.

For convenience and accuracy, numerical information is often represented in digital form for processing or computation. The speed, reliability and accuracy of digital data processing equipment exceed those qualities possessed by analogue computing or processing devices. But in order to utilize the processed information produced by a digital computer or the like, and create a corresponding control of a physical condition or variable, it is necessary at some stage in the operation to convert information from one form to the other. While it is desirable in some instances to convert analogue variations into digital form, it is more important in other instances to convert digital representations into analogue form. It is to this latter problem of converting digital information to analogue form, often termed "decoding," that the present invention is addressed.

It is the general aim of the invention to bring forth a new and improved decoder for converting digital signals into corresponding quantized analogue phase variations which are readily accepted by known servo controls to effect corresponding variations in physical quantities.

More particularly, an object of the invention is to provide a decoder which is very fast and reliable in its operation, accepting digital signals which may be spaced apart by time intervals which are either uniform or non-uniform, and either very short or long.

Another object is to create such a decoder which is completely electrical, involving no moving mechanical parts and being operable at extremely high speeds with a high degree of accuracy.

A further object of the invention is to provide, as a sub-combination finding numerous advantageous applications, means for producing, from first and second strings of randomly recurring signals, a third string of signals containing one signal for each signal in the first string but spaced apart or non-coincident in time with any of the second string signals.

It is an additional object of the invention to provide, as a novel sub-combination susceptible of a variety of uses, means for algebraically combining first and second strings of non-coincident signals to produce a signal string which selectively contains either the sum or the difference of the pulses in the two signal strings.

Other objects and advantages will become apparent as the following description proceeds, taken in conjunction with the accompanying drawings, in which:

FIGURE 1 is a block-and-line diagram of a decoder embodying the features of the present invention;

FIG. 2 is a block-and-line diagram similar to FIG. 1 but illustrating in more detail the individual components which go to make up each of the units shown in FIG. 1;

FIG. 3 is a block-and-line diagram similar to FIG. 2, illustrating a modification in the add-delete means, and showing one system for effecting sign selection;

FIG. 4 is a schematic circuit diagram of the "chronizer" illustrated in block form by FIG. 2;

FIG. 4a is a graphical representation of typical wave forms produced by one part of the "chronizer";

FIG. 5 is a block-and-line diagram of a modified and preferred form of the "chronizer";

FIG. 6 is a schematic circuit diagram of the "chronizer" illustrated in FIG. 5;

FIG. 7 is a schematic diagram of the add-delete means illustrated in block form by FIG. 2;

FIG. 8 is a schematic diagram of typical flip-flop circuits employed in the scaling channels of FIG. 2;

FIG. 9 is a graphic illustration of waveform variations which occur in the decoder;

FIG. 10 is a graphic illustration of the phase-shifted output waves of the present decoder when operating in the "add" mode; and FIGS. 11 and 12 are similar to FIGS. 9 and 10 but illustrate the waveform variations which occur when the decoder is operating in the "delete" mode.

Figure 11:
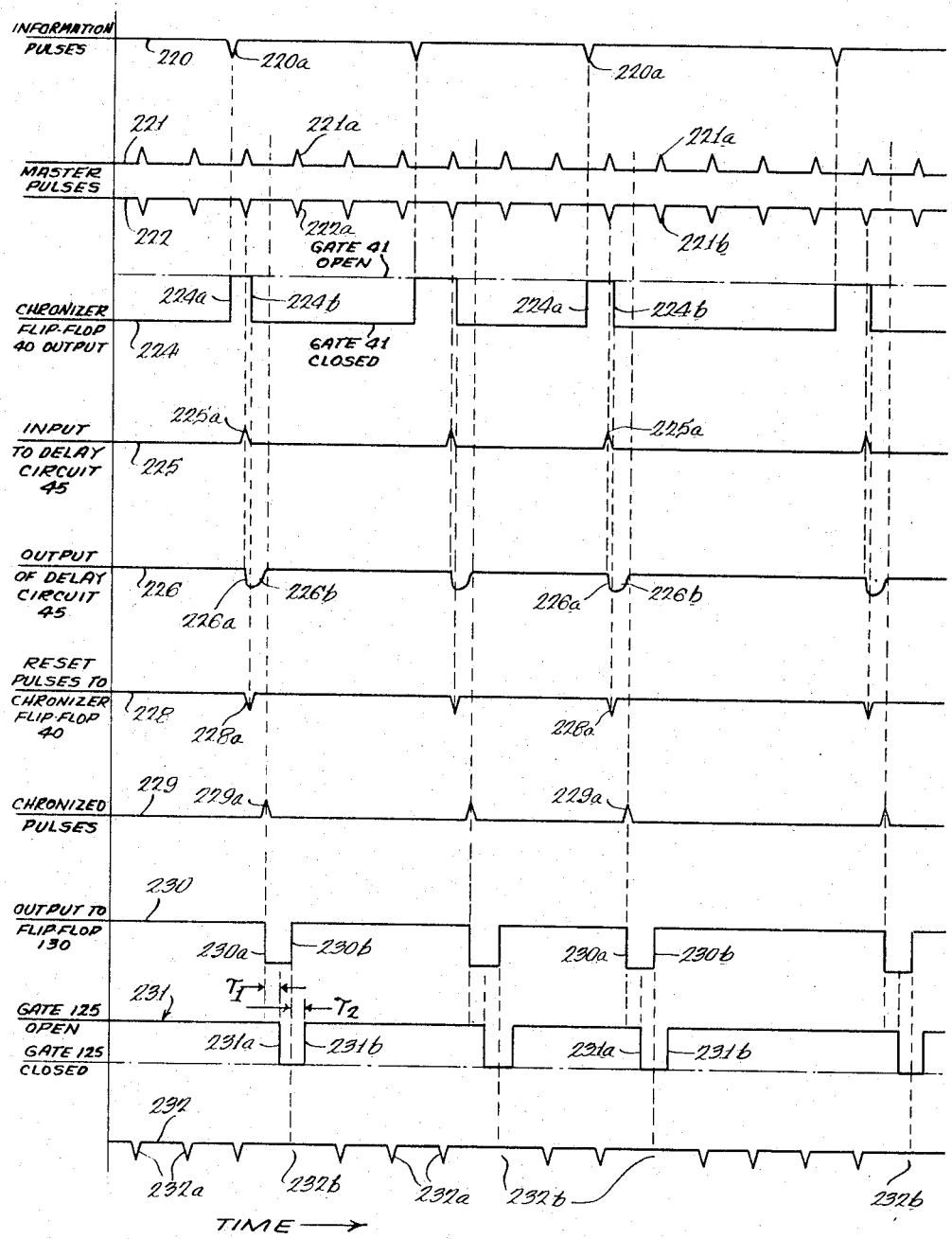

While the invention has been shown and will be described in some detail with reference to the particular embodiments thereof, there is no intention that it thus be limited to such detail. On the contrary, it is intended here to cover all such modifications, alternatives, and equivalents falling within the spirit and scope of the invention as described by the appended claims.

*General description of components and their functional purposes*

Referring now to FIGURE 1, the decoder there shown in block diagram form is intended to accept time-spaced information signals, which may for example, be electrical voltage pulses and which digitally represent a desired physical variation. Information pulses, sometimes called command pulses, may be supplied from any suitable source 10 to a decoder input terminal 11. It is sufficient to observe only that the information pulses or signals need not occur at any particular frequency, but on the contrary, may occur randomly. Each information pulse may represent one increment of a total desired variation, and the instantaneous rate or frequency at which the information pulses occur will accordingly represent the rate of change for that variation.

For one exemplary illustration of a source of information pulses such as that here diagrammatically indicated at 10, reference may be had to the copending application of McDonough et al., Ser. No. 589,491, filed June 6, 1956 (now superseded by a continuation application Ser. No. 271,558 filed Apr. 5, 1963). In that application, the information pulses or "command" pulses each represent an increment of distance through which a machine tool element is to be moved, and the frequency with which the information pulses occur thus represents the velocity or feed rate which the machine tool element is to have. By way of example, each information pulse may be assigned a distance value of .000125 inch, so that if it is desired to move the element five inches, forty thousand information pulses would be supplied by the source 10. Further, if it were desired to move the machine tool element at the rate of one inch per minute, then those forty thousand pulses would be spaced over a time interval of five minutes, and thus would be made to have a frequency of eight thousand pulses per minute or 133.3 per second. Greater distances may be represented by greater numbers of pulses, and different velocities or feed rates may be represented simply by making those pulses have other frequencies.

In response to the information pulses supplied to the input terminal 11, the decoder illustrated in FIGURE 1 generates two recurring waves at its output terminals 14 and 15. Those recurring output waves are relatively phase-shifted by amounts and at rates corresponding to the total number of information pulses received, and the rate at which such information pulses are received. Since the two waveforms have variations in phase, they constitute an analogue variation which is measurable by means such as well known phase detectors. Thus, those phase-shifted output signals can be used to control the energization of motors or other power devices with appropriate servo mechanisms in order to cause a desired variation in a physical condition or quantity. As described more fully in the above-mentioned McDonough et al. application, such phase-shifted output signals may be caused to control drive motors which translate movable machine tool elements through the distances and at the rates represented by the information pulses and their frequency.

The decoder, in accordance with the invention, includes a source 16 for generating recurring master pulses. A master pulse source 16 is preferably organized to produce recurring pulses which have a substantially constant frequency, and such frequency is chosen to be greater than the maximum instantaneous frequency which the information pulses supplied by the source 10 will have. As illustrated in FIG. 2, the master pulse source 16 may comprise a blocking oscillator 18 supplying positive-going output pulses over a line 19 which connects with two output lines 20, 21.

Further, for a purpose to be made clear below, it is desirable in the present instance to provide negative-going master pulses. For this purpose, the blocking oscillator 18 is also connected through an inverter 18a to two additional output lines 22 and 24. However, because the positive-going pulses appearing on the lines 20, 21 and the negative-going pulses appearing on the lines 22, 24 are all generated by the master pulse source 16, they may be viewed simply as a single string of substantially constant frequency pulsating or recurring signals, all coming from the same source and appearing at substantially the same instants in time on the output lines 21, 22, 20 and 24.

While there has been illustrated in FIG. 2 a conventional blocking oscillator 18 and a well known inverter 21 making up the master pulse source 16, it will be apparent to those skilled in the art that a great many different arrangements may be employed to generate the master pulse train which appears on the lines 20, 21 and 22, 24.

An important part of the present decoder is the chronizer 25 which receives the time-spaced information pulses from the input terminal 11, and also receives a first pulse string or the recurring master pulses appearing on the line 21. The function of the chronizer 25 is to generate, in response to the series of random information pulses applied to the input terminal 11 and the string of master pulses supplied over the line 21, a chain of pulses at its output terminal 26 which are equal in number to the information pulses, but spaced in time from or non-coincident with any of the master pulses.

Because the series of information pulses appearing on the input terminal 11 may occur with different frequencies, or even be randomly spaced in time, there is the possibility that one or more of such information pulses might occur at the instant that one of the master pulses occurs. This would make it difficult to distinguish between the information pulses and the master pulses because the action produced thereby would take place at the same instant. Since the action of the device 25 is to assure that the information pulses and master pulses are not time coincident or synchronized, that device has been aptly termed a "chronizer."

In further carrying out the invention, the "chronized" chain of pulses appearing on the terminal 26 (and which are non-coincident in time with the master pulses appearing on the lines 20, 21, 22 and 24) are supplied through an add-delete means 28, together with the positive-going and negative-going master pulses appearing on the lines 20 and 22. The add-delete means have the function of producing on a single output terminal 29 a string of pulses which contains the algebraic sum of the pulses appearing in the chronized chain and the master pulse string. That is, the pulse string appearing on the terminal 29 is substantially identical to the master pulse string appearing on the line 24, but is selectively modified so that it contains one more or one less pulse for each pulse appearing in the chronized pulse chain. To selectively control the operation of the add-delete means 28 in order to produce algebraic addition or subtraction, a sign selection control 30 is associated therewith, and connected by control lines 31, 32.

Thus, the string of master pulses appears on the line 24, while a stream of pulses appears on the terminal 29 which contains the algebraic combination of the information pulses and the master pulses. The stream of pulses contains one more or one less pulse than the master pulse string for each of the information pulses.

In accordance with the invention, the master pulse string on the line 24 and the algebraically combined pulse stream appearing on the terminal 29 are supplied to the respective inputs of two identical frequency dividers or scaling channels 34 and 35. The first scaling channel 34 is termed the "reference" scaling channel since, by its frequency dividing action in response to all of and only the master pulses it will produce from the master pulses supplied over the line 24 a recurring waveform on the output terminal 14 which is of a substantially uniform frequency and phase. The second scaling channel is termed the "control" channel since, by frequency dividing the algebraically combined pulse stream supplied over the terminal 29, i.e., normally responding to the master pulses but having its action modified to produce one more or one less response for each information pulse, it will produce on the output terminal 15 a recurring waveform which shifts in phase relative to the reference waveform appearing on the terminal 14.

In this manner, two output waveforms are generated, the control channel waveform being modulated or shifted in phase relative to the reference channel waveform by amounts and at rates which correspond to the number and instantaneous frequency of the information pulses received from the source 10.

Since the two scaling channels 34 and 35 are substantially identical, i.e., have identical scaling ratios, and in the absence of any information pulses, will respond to identical numbers of substantially coincident pulses from the master pulse source 16, the phase of the two output waves will not change if no information pulses are received. That is, the reference scaling channel 34 is connected to receive as inputs all of and only the master pulses from source 16, and the control scaling channel 35 is connected also normally to receive and respond to the master pulses. The add-delete means 28, however, changes the response of the control channel 34 so that the registered count is changed, i.e., increased or decreased, a predetermined amount for each information signal thereby shifting the phase of the control waveform relative to the reference waveform. The phase of two recurring waveforms may be measured and utilized in a variety of ways. For example, the two output waveforms appearing on the terminals 14, 15 may be supplied to a phase discriminator of any well known type and which will produce a D.C. voltage which by its polarity indicates the sign of the phase difference between the two output waves and which in magnitude is proportional to the phase difference between the two output waves. Such a D.C. signal may, in well known manners, be employed to control motor operators or servo systems which will cause the desired variations in physical conditions such as the positions, velocities, and accelerations of movable elements.

In order that the complete organization of the illustrated decoder and the operation thereof will be completely understood, each of the principal components illustrated in block form by FIGURE 1 will now be described in more detail.

*The chronizer.—In general*

Referring now to FIG. 2, the chronizer 25 is there illustrated in more detail, and includes a bi-state device such as a flip-flop circuit 40 which may be set to either one of two states. For convenience, those two states are designated as the "1" state and the "0" state. The device 40 is connected to receive the information pulses appearing on the terminal 11 and to be set to a particular one of its two states, e.g., the "1" state, in response to each such information pulse.

Further included in the chronizer 25 is a gate 41 which is connected via a line 42 with the flip-flop 40, so that the latter opens the gate when it is in the "1" state and closes the gate when it is in the "0" state. The input terminal for the gate 41 receives the string of positive-going master pulses from the source 16 over the line 21, and is operative to pass those pulses to a gate output conductor 44 only when the gate is open. Pulses passed by the gate 41 are then delayed by a suitable delay means 45 and passed thence to the chronizer output terminal 26. The delay means 45 makes the pulses appearing on the terminal 26 lag by a predetermined time interval from the pulses passed by the gate 41 and appearing on the conductor 44. The length of this delay is chosen to be somewhat less than the period between successive master pulses. As a result, each information pulse appearing on the terminal 11 triggers the flip-flop 40 to make the latter open the gate 41 so that the next master pulse from the line 21 is passed to the conductor 44, and is thence delayed by a time interval to assure that the pulse appearing on the terminal 26 is spaced in time between successive master pulses.

In order to return the bi-stable device or flip-flop 40 to the "0" state, and thus to re-close the gate 41, a feedback connection from the output of the delay means 45 is established by a conductor 46 to a second or "reset" terminal of the flip-flop 40. Thus, whenever one of the master pulses from the line 21 is passed through the gate 41, delayed by the means 45, and passed to the terminal 26, a pulse is also supplied back to the flip-flop 40 to re-set the latter to the "0" state. This immediately re-closes the gate 41 so that the following master pulses cannot pass therethrough. When the next information pulse is received, the flip-flop device 40 will again be set to the "1" state and the above described operation repeated.

It will thus be apparent that in response to each of the information pulses, one and only one pulse appears on the chronizer output terminal 26 because a pulse will be fed back over the conductor 46 to re-set the flip-flop 40 before the next master pulse appears on the line 21.

Shown in FIG. 2 are two differentiators 48 and 49, which are employed to convert the output waveform of the particular delay means 45 here employed into pulses of the desired polarity. The purpose and function of these differentiators will be made more clear in the following description with reference to FIG. 4.

*In detail*

An exemplary organization of detailed circuitry for the chronizer 25 is illustrated in FIG. 4, including the principal components mentioned above, namely, the bi-state flip-flop 40, the gate 41, and the delay means 45. While the bi-state device used in the chronizer may take a variety of forms, the flip-flop circuit 40 here employed includes two triode electron discharge devices 50, 51, each having a cathode 50a, 51a, a control grid 50b, 51b, and an anode 50c, 51c. The cathodes are coupled together by a connection through a common resistor 52 to a conventionally represented negative terminal B— of a suitable direct voltage source. The anodes 50c, 51c are connected through load resistors 54, 55 and 56, 57 to the positive terminal B+ of the voltage source, the junction between each pair of load resistors being clamped so it cannot rise above ground or zero volts in potential by unidirectionally conductive diodes 58, 59. Cross-connection from the anode of the discharge device 50 to the control electrode of the device 51 is made by a capacitor 60 paralleled with a resistor 61; while a similar cross-connection from the anode 51c to the control electrode 50b is made by a capacitor 62 paralleled with a resistor 63.

Whenever one of the discharge devices 50 is conducting, its anode will be at a relatively low potential due to the potential drop across its load resistors, and this low potential is coupled by the cross-connecting means just mentioned to the control electrode of the other device so that the latter is biased below cut-off. The two possible states of the flip-flop 40 may be characterized by the arbitrary notation that in the first or "1" state the device 51 is cut off and the device 50 is conducting; and in the second or "0" state, the device 51 is conducting and the device 50 is cut off. An output line 68 leading from the junction between the load resistors 55 and 57 is thus placed at substantially zero volts (relative to ground potential) when the flip-flop is in the "1" state, and it is held at a lower voltage, say, −15 volts, when the flip-flop is in the "0" state.

To set the flip-flop to its "1" state a negative incoming pulse from the terminal 11 is applied to the control electrode 51b through an isolating diode 69, thus causing a decrease in the current flow through device 51 and resulting in an increase in the potential of its anode 51c. The increase in that anode potential is transferred through the cross-connection 62, 63 to the control electrode 50b, which thus causes an increase in current through the device 50. This increase in conduction by the device 50 decreases the potential at its anode 50c, and this decrease is transferred through the coupling 60, 61 to further increase the potential of the anode 51b. By this cumulative feedback action produced by the cross coupling of the anode of each tube to the control grid of the other tube, the state of the device 40 is rapidly switched to the "1" state in response to each of the information pulses appearing on the input terminal 11.

In order to re-set the flip-flop 40 to the "0" state, a negative-going pulse may be applied to the control electrode 50b of the discharge device 50, tending to cut off the latter and initiate conduction by the discharge device 51. As a result, a negative-going pulse applied over the conductor 46 will re-set the flip-flop 40 to its "0" state and rapidly switch the output conductor 68 from zero volts in potential to substantially −15 volts in potential.

The flip-flop output conductor 68 leads via a resistor 74 and a capacitor 75 to the second control electrode 76a of a gate tube 76. As here shown, the gate 41 is made up of a pentagrid electron discharge device 76 having a first control grid 76b, screen grids 76c, a suppressor grid 76d, and an anode 76e. Its cathode 76f may be connected directly to a point of ground potential, and its anode 76e is connected through load resistors 78, 79 to the positive terminal B+ of a direct voltage source. A string of positive-going master pulses from the source 16 is supplied over a line 21 through a capacitor 80 to the first control grid 76b of the device 76, that control grid being normally biased below cut-off potential by connection through a resistor 81 to the negative terminal C− of a biasing voltage source.

Signals passed by the gate tube 76 are taken from the junction of the resistors 78, 79 through a capacitor 82 and supplied to the control electrode 84a of an inverter tube 84 having its cathode 84b connected to ground and its anode 84c connected through a load resistor 85 to the B+ terminal. The gate output line 44, which is connected to the anode 84c of the inverter thus receives pulses passed by the gate but which are of inverted polarity.

It will be readily understood by those skilled in the art that the gate tube 76 can only conduct appreciably when both its first and second control grids 76b and 76a are above cut-off potential. Thus, as master pulses are received over the line 21 and successively increase the potential of the first control grid 76b, the gate tube 76 cannot and will not transmit those pulses unless the flip-flop device 40 is at that time holding the second control grid 76a above cut-off potential. It will be apparent that when the flip-flop 40 is in the "0" state, so that the line 68 is at a −15 volt potential, the gate tube 76 will be "closed" and will not pass master pulses received over the line 21.

On the other hand, when the flip-flop device 40 is in the "1" state so that the second control grid 76a is higher in potential, then positive-going master pulses received over the line 21 will successively increase the potential of the control electrode 76b so that the tube 76 will momentarily conduct current and will produce negative-going pulses at the junction of the resistors 78 and 79.

These negative-going pulses will momentarily reduce the potential of the control electrode 84a and thus decrease the current flow through the normally conducting inverter tube 84, causing the anode 84c of the latter to momentarily increase in potential and thus creating positive-going pulses on the conductor 44.

The delay means 45 here illustrated in FIG. 4 is made up of a pentagrid electron discharge device 88 connected in what is known as a "phantastron" circuit. Such a circuit is similar in its basic operation to the well known monostable multivibrator circuit, but has the advantages of requiring but one discharge device and of producing delays of precisely desired time intervals. For a detailed analysis of the organization and operation of the phantastron circuit, reference may be had to pages 104–110 of "Principles of Radar," 3rd edition by Reintzes and Coate, published by the McGraw-Hill Book Company (New York) in 1952.

For present purposes it will suffice to observe only that under normal conditions little or no electron current flows from the cathode 88a to the anode 88b of the tube 88, but rather flows principally from the cathode 88a to the screen grids 88c which are connected through a load resistor 89 to the B+ terminal of a suitable voltage source. This current flow creates a relatively large potential drop across the cathode resistor 90, so that the cathode is actually positive in potential with respect to a second control grid 88d which is connected by a resistor 91 to a point of ground potential. Despite the fact that the first control grid 88e is connected through resistors 92 and 93 to the B+ terminal, the cathode current flow through the resistor 90 leaves the first grid 88e only slightly positive with respect to the cathode 88a.

If now a positive pulse is received on the second control grid 88d, it tends to increase current flow from the cathode to the anode 88b and tends to decrease the amount of current which flows to the screen grids 88c and thence through the resistor 89. As current flow to the plate 88b increases and thus creates a voltage drop across the plate load resistor 92, the first control grid 88e is reduced in potential via a feedback coupling capacitor 94. Accordingly, the total cathode current flow through the resistor 90 is sharply reduced and the potential at the cathode drops sharply as indicated at the leading edge 95a of a typical waveform 95 shown in FIG. 4a. As the capacitor 94 then re-charges, however, the potential of the first control grid 88e is gradually increased, thus again increasing the cathode current and the potential drop across the cathode resistor 90. The second control grid 88d now again being at substantially ground potential due to the termination of the input triggering pulse, current flow tends to pass primarily over the screen grids 88c rather than through the second grid 88d and to the anode 88b. Accordingly, cathode current flow rises abruptly as illustrated by the trailing edge 95b of the waveform 95 in FIG. 4a, such trailing edge being spaced by a predetermined time interval τ from the instant that the triggering pulse occurred. With a negative-going substantially square waveform of the general type shown at 95 occurring at the cathode 88a in response to each input pulse received on the line 44, a differentiator made up of a capacitor 96 and a resistor 98 thus supplies the positive-going pulses resulting from the trailing edge 95b of the waveform to the control electrode 99a of a triode discharge device 99 which is employed simply as a buffer amplifier. It will be seen that a diode 100 shunts the negative-going pulses resulting from the differentiation of the waveform 90 so that these are not applied to the control electrode 99 which is normally biased below cut-off by connection to the biasing terminal C—.

In response to each of the positive-going pulses applied to its control electrode 99a, the device 99 conducts for a very short interval and thus passes current through the primary winding 101 of a coupling transformer 102 having its secondary winding leading to the chronizer output terminal 26.

In review, each pulse passed by the gate 41 produces a delaying waveform 95 generated at the cathode of the phantastron delay tube 88, and by differentiation and clipping, the trailing edge of that waveform is utilized to cause a sharp output pulse, delayed a predetermined interval from the pulse passed by the gate, to appear on the output terminal 26.

In order to re-set the flip-flop 40 to its "0" state, and thus re-close the gate 41, the feedback conductor 46 leads from the cathode 88a of the phantastron delay tube 88 through the differentiating circuit 49 (made up of a capacitor 104 and a resistor 105) and through a clipping diode 106 to the control electrode 50b. Thus, the differentiator 49 produces a sharp potential drop at the control electrode 50b in response to the leading edge 95a of the waveform 95, and this in turn results in cut-off of the tube 50 and conduction of the tube 51. The positive-going pulses resulting from differentiation of the trailing edge 95b of the waveform 95 have no effect on the flip-flop 40 since the latter will at that time already be in the "0" state and since the diode 106 will not conduct in response to such positive-going pulses.

Résumé of operation

It is believed that the operation of the chronizer circuitry will be clear from the foregoing description. Such operation may be summarized with reference to FIG. 9 wherein the recurring information pulses applied to the terminal 11, are represented at 200. The positive-going master pulses appearing on the lines 20 and 21 are represented at 201; and the negative-going master pulses appearing on the lines 22 and 24 are represented at 202. In response to each negative-going information pulse, say the pulse 200a in FIG. 9, received on input terminal 11, the output potential (see graph 204, FIG. 9) of the flip-flop 40 rises (as at 204a), and places a relatively high potential on its output line 68 which "opens" the gate tube 76 (FIG. 4). The next master pulse 201a (FIG. 9) which appears on the line 21 thus is passed through the gate 41 (FIG. 2), and appears at the control electrode 84a (FIG. 4) as a negative-going pulse. This is inverted and appears on the conductor 44 as a positive-going pulse (see the pulse 205a in the line 205, FIG. 9, which represents input pulses to the delay means 45) which triggers the phantastron delay circuit 45 (FIG. 4) into one timing cycle, producing a voltage waveform 95 (FIG. 4a) at the cathode 88a. The leading edge 95a (see 206a, FIG. 9) of the waveform 95 is differentiated to produce the negative-going pulses (shown at 208, FIG. 9) and fed back over the line 46 to re-set the flip-flop 40 to the "0" state so that its output potential drops (at about 204b, FIG. 9) and closes the gate 41. The next master pulse (201b, FIG. 9) appearing on the line 21 will not be passed by the gate 41.

The trailing edge (see 206b, FIG. 9) of the phantastron waveform 95 is changed, by differentiation, into a positive-going pulse which is supplied through the buffer amplifier 99 (FIG. 4) and the isolating transformer 102 where it appears as a positive-going pulse on the output terminal 26. These latter pulses are represented at 209 in FIG. 9, and will be seen to be spaced apart from or non-coincident with any of the master pulses 201, 202. The pulses 209 are "chronized."

While the exact interval of delay created by the delay means 45 is not critical, it is preferable to make it substantially equal to one-half of the period elapsing between successive master pulses 201 generated by the source 16 and appearing on the conductor 21. This assures that if both the master pulses from the source 16 and the chronized stream of pulses appearing on the output terminal 26 are supplied as inputs to the same element, they will not coincide but will each produce a separate and positive response.

MODIFIED CHRONIZER

FIGS. 5 and 6 illustrate a modification in the chronizer previously described with reference to FIGS. 2 and 4, and which represents an improved and preferred form of the circuitry.

In general

Referring to the block diagram of FIG. 5, it will be seen that the modified chronizer includes a bi-state device or flip-flop 40A which receives information pulses on an input terminal 11A and controls the opening and closing of a gate 41A in a manner previously described. However, in the modified form the pulses passed by the gate 41A are not supplied to delay means, but rather are fed directly back over a conductor 110 to re-set the flip-flop 40A to the "0" state. Thus, in response to each information pulse, the gate 41A is opened and as soon as the next master pulse appears on the line 21 and passes through the gate, it is returned over the line 110 to re-set the flip-flop.

To generate a chronized pulse which is delayed a predetermined interval from the master pulse in response to each information pulse, the voltage output wave of the flip-flop 40A is supplied to a differentiator 111, and then through an inverter and clipper 112 to the delay means 45A. Since the voltage variation produced by the flip-flop 40A is substantially a square waveform of the varying duration, the leading edge results in a positive-going pulse produced by the differentiator 111 and the trailing edge in a negative-going pulse produced by the differentiator. The inverter and clipper 112 discards the pulse produced by the leading edge of that waveform and responds only to the negative-going pulse produced by the trailing edge, inverting that negative-going pulse so that it is supplied as a positive-going pulse to the delay means 45A.

In detail

The foregoing will become more clear with reference to the detailed circuitry illustrated in FIG. 6, wherein the flip-flop circuit 40A is substantially identical to that previously described in connection with FIG. 4. Its output line 68A connects through a resistor to the control grid of a gate tube 76A which is connected substantially as previously described. Pulses passed by the gate tube 76A and appearing on the line 110 are returned through the differentiating capacitor 104A and resistor 105A to cause cut-off of the discharge device 50A and conduction of the device 51A. Thus, it will be apparent that the flip-flop is set to its "1" state by each information pulse, thus opening the gate tube 76A which then passes the next master pulse appearing on the line 21 so that it is returned to re-set the flip-flop 40A to its "0" state. The potential variation appearing on the flip-flop output line 68A thus has a square waveform such as illustrated at 114 in FIG. 6. That potential variation is supplied over a line 115 to the differentiator 111 made up of a capacitor 116 and a resistor 118 which normally holds the control grid 119a of an inverter tube 119 above cut-off potential. Thus, the inverter tube 119 is normally conducting heavily and in response to the positive-going pulses produced as a result of differentiating the leading edge of the waveform 114 produces no appreciable response. However, in response to differentiation of the trailing edge of the waveform 114 which produces a negative-going pulse on the control electrode 119a, current conduction of the inverter tube 119 drops sharply, producing a positive-going pulse at its anode 119b which is supplied to the second control grid of a phantastron-connected delay tube 88A. The phantastron circuit is organized and functions in substantially the same manner as previously described in connection with FIG. 4 producing at its cathode a waveform of predetermined duration, the trailing edge of which results in the buffer amplifier 99A producing a pulse on the chronizer output terminal 26A.

This modified chronizer is preferred over that form illustrated by FIGS. 2 and 4 since it provides even more reliable operation. Referring to FIG. 4 it will be apparent that if the flip-flop 40 switches to its "1" state at almost the same instant that a maser pulse occurs on the line 21, the gate tube 76 may be only partly conductive so that the master pulse will be passed through the gate with reduced amplitude. Accordingly, a weak positive-going triggering pulse will appear on the input line 44 for the phantastron delay circuit 45. The phantastron delay circuit under these conditions will respond by producing a waveform such as that illustrated by dashed lines at 97 in FIG. 4a. This has an abruptly dropping leading edge 97a but rises very smoothly back to its original potential level. Therefore, the leading edge of he phantastron output wave 97a when differentiated will produce a pulse of sufficient strength to re-set the flip-flop 40 to its "0" state, but the lack of a rapidly changing trailing edge in the waveform 97 may result, after differentiation by the capacitor 96 and the resistor 98, in a pulse of insufficient amplitude to appreciably affect the buffer amplifier 99. If this would occur, even though the possibility is remote, one information pulse would be "lost," that is, there would be no chronized pulse appearing on the terminal 26 in response to that particular information pulse which initially "set" the flip-flop 40.

In the modified arrangement illustrated by FIGS. 5 and 6, the foregoing difficulty is eliminated. Assume that an information pulse switches the flip-flop 40A to its "1" state at just about the same instant that a master pulse arrives on the line 21. If the gate tube 76 is sufficiently conductive to pass the master pulse with sufficient amplitude to re-set the flip-flop 40A, then a very strong pulse will result from differentiation of the trailing edge of the output waveform 114. This pulse will, therefore, positively act through the inverter tube 119 to fully trigger the phantastron tube 88A so that the latter produces a full and complete waveform 95 with an abruptly rising trailing edge. On the other hand, if switching of the flip-flop 40A to its "1" state is in progress when a master pulse appears on the input line 21, so that the pulse passed by the gate is of marginal amplitude insufficient to re-set the flip-flop 40A, the gate tube 76A will simply remain open until the next master pulse is received. The latter master pulse will then be passed in full strength to re-set the flip-flop, causing the differentiating circuit 116, 118 and the inverter 119 to trigger the phantastron delay tube 88A.

It is virtually impossible for an information pulse to be "lost" by employing the arrangement illustrated in FIGS. 5 and 6. If the flip-flop 40A is not re-set to the "0" state by a given master pulse, due to the fact that the gate 41A is not sufficiently open, then the gate tube 76A will remain conductive until the next master pulse occurs, and will pass that master pulse to re-set the flip-flop 40A, producing one chronized output pulse corresponding to the input pulse which previously appeared on the terminal 11A.

THE ADD-DELETE MEANS

In general

As illustrated in block-and-line form by FIG. 2 an exemplary form of the algebraic combining means or add-delete circuitry includes provision for passing both the chronized pulses appearing on the terminal 26 and the string of master pulses appearing on the line 20 to a common output terminal 29. Such means take the form of a first gate 125 which is so controlled as to be normally open, and a second gate 126 which is open when the add-delete means is to be operated in the "add" mode. Master pulses appearing on the line 20 are supplied as input signals to the gate 125 and will be passed through that latter gate to the terminal 29. Similarly, the chain of chronized pulses appearing on the terminal 26 are supplied directly to the input gate 126 and will pass through the latter to the terminal 29. Because the chain of chronized pulses is non-coincident with the master pulses appearing on the line 20, the stream of pulses resulting on the terminal 29 will contain one pulse for each master pulse, and one pulse for each information pulse, the two being interposed in time between one another.

In order to effect algebraic subtraction, or a deletion of master pulses, so that the stream of pulses appearing on the terminal 29 is substantially the same as the string of master pulses except that it contains one less pulse for each information pulse, means are provided to normally pass all of the pulses in the master string to the output terminal 29. Such means as here shown comprise the normally open gate 125 which functions as a part of the add-delete circuit when the latter is operating in the "delete" mode. Means are also provided for disabling the master pulse transmitting gate 125 in response to the occurrence of each signal in the chronized pulse chain appearing at the terminal 26. Still further, provision is made to restore or reopen the gate 125 in response to the next-occurring master pulse after it has been disabled or closed. To accomplish this, a third gate 128 is employed which receives as its input the chronized chain of pulses appearing on the terminal 26.

The gates 126 and 128 are complementally controlled by means of a sign-selection control 129 so that the former is open and the latter is closed when summation of pulses or operation in the "add" mode is desired, and so that the former is closed and the latter is open when operation in the "delete" mode is desired. In the "delete" mode, therefore, the pulses in the chronized chain appearing at the terminal 26 cannot reach the output terminal through the gate 126, but pass through the gate 128 to set a bistate device here shown as a flip-flop circuit 130 to its "0" state. The flip-flop device 130 is connected through a delay element 131 to control the gate 125, and specifically, to close the gate 125 whenever the flip-flop is in its "0" state. Thus, it will be apparent that a short instant after each chronized pulse appearing on the terminal 26, the gate 125 is closed so that the next master pulse appearing on the line 20 cannot pass through that gate to the terminal 29. However, the same master pulse which is blocked by the closed gate 125 in appearing on the line 22 is supplied to the flip-flop 130 in a manner to re-set the latter to its "1" state so that the gate 125 will, after a short delay due to the element 131, be re-opened. Succeeding master pulses appearing on the line 20 will thus pass through the gate 125 to the terminal 129.

In this manner, each time that an information pulse appears on the terminal 26, the gate 125 will be closed to block the next master pulse so that it cannot reach the output terminal 29. However, that same master pulse is caused, via the flip-flop 130 to reopen the gate 125 so that only one master pulse is blocked for each chronized pulse which is received. Thus, the stream of pulses appearing on the terminal 29 when the add-delete circuitry is operating in the "delete" mode contains successively occurring pulses which correspond to the string of master pulses generated by the source 16, except that one of those master pulses is deleted or blocked each time that an information pulse appears on the terminal 11.

In detail

Considering the add-delete means 28 in more detail with reference to FIG. 7, it will be seen that the first, second and third gates 125, 126 and 128 may take the specific form of pentagrid electron discharge devices each having a first control grid 125a, 126a, 128a, and a second control grid 125b, 126b, and 128b. The cathodes 125c, 126c and 128c of the gate tubes may be connected directly to ground and the corresponding anodes 125d, 126d, and 128d may be connected through a suitable load means to the positive terminal B+ of a suitable direct voltage source. The screen grids of each gate tube here are connected to a positive voltage source here represented by the symbol S+, while the suppressor grids are connected directly to their associated cathodes.

Because the gates 125 and 126 both pass pulses to the common output terminal 29, they may have their anodes 125d, 126d connected through a common load which in the present instance is a pulse-shaping circuit made up of an inductance 135 connected in parallel with the series combination of a load resistor 136 and a unidirectionally conductive diode 138. When either of the gate tubes 125 or 126 conducts momentarily, the current pulse flowing through the inductance 135 will set the latter into oscillation owing to the natural stray capacity which it has. Thus, it will oscillate for one cycle and on the second half-cycle when the voltage thereacross has the polarity indicated in FIG. 7, the resistor 136 and diode 138 will create a voltage drop with the polarity indicated across the resistor. This action damps and prevents further oscillations, and yet creates a relatively short negative-going pulse on the output terminal 29.

A similar pulse-shaping load network made up of an inductance 139 having a series-connected resistor 140 and diode 141 in parallel therewith is provided for the gate tube 128. Negative-going output signals appear on the line 142 of the gate 128 in response to momentary conduction of the latter.

*Add mode operation*

When the circuitry illustrated by FIG. 7 is to be operated in the "add" mode, a positive potential will be supplied by the sign selection control means 129 (FIG. 2) to a terminal 144 which will place the second control grid 126b of the gate 126 above the cut-off value. Accordingly, pulses supplied to the first control grid 126a will pass through the gate 126 and appear as negative-going pulses on the output terminal 29. Also, when operating in the "add" mode, a negative potential will be applied to a terminal 145 which will place the second control grid 128b of the gate tube 128 below cut-off, so that this gate cannot pass pulses supplied from terminal 26 to its first control grid 128a. When in the "add" mode the flip-flop 130, which is organized in substantially the same manner as the flip-flop 40 previously described in connection with FIG. 4, will be in the "1" state, its output conductor 146 being at a relatively high potential, biasing the control grid 125b of the gate tube 125 to a value above cut-off. Therefore, with master pulses appearing on the line 20 supplied through a capacitor 148 to the first control grid 125a, the gate 125 will pass a current pulse each time that a master pulse occurs. The control grid 125a is normally biased below cut-off by means of a resistor 149 and a diode 150 leading to a suitable negative biasing source here indicated by the conventional symbol C—.

Ii the "add" mode, therefore, chronized pulses appearing on the terminal 26 (see pulses 209, FIG. 9) and supplied through a capacitor 150 to the control grid 126a of the gate 126 will be passed to the terminal 29. In like manner, master pulses appearing on the line 20 (see pulses 202, FIG. 9) will be passed by the gate 125 to the terminal 29. Since the chain of chronized pulses 209 appearing on the terminal 26 are not coincident with the master pulses 202 appearing on the line 20, the stream of pulses 210 resulting on the terminal 29 will be the sum of the master pulses and the chronized pulses, i.e., will contain one pulse 210a for each master pulse 202 and one pulse 210b for each information pulse 200 (FIG. 9).

*Delete mode operation*

When it is desired to operate the circuitry illustrated in FIG. 7 in the "delete" mode, the terminal 144 is supplied with relatively low potential and the terminal 145 with relatively high potential. This closes the gate 126 so that the chronized pulses supplied from the terminal 26 to its first control grid 126a, cannot pass to the output terminal 29. It also opens the gate 128a (Fig. 7) so that chronized pulses appearing on the terminal 26 and transferred through a capacitor 151 to the first control grid 128a will be passed through the gate tube 128 and appear as negative-going pulses on the gate output line 142.

Waveforms for operation in the "delete" mode are shown in FIG. 11, the pulse signals and voltage variations 220–229 therein being identical to those shown at 200–209 in FIG. 9, since the operation of the chronizer is identical in either the add or the delete mode. The pulses 229 in FIG. 11 are the chronized pulses appearing on the terminal 26 (FIGS. 2 and 7).

The output line 142 at the gate 128 leads, via a capacitor 155 and a diode 156 to the control electrode 159a of a discharge device 159 forming a part of the flip-flop 130 (FIG. 7). Each chronized pulse (229, FIG. 11) will thus cause the device 159 to cease conduction, and will cause the other discharge device 158 in the flip-flop circuit 130 to begin conduction by virtue of the cross connections between the anodes and control electrodes of the two devices. When the device 158 begins conducting, the output potential (230, FIG. 11) taken from the junction of its two anode resistors will drop abruptly (at 230a, FIG. 11) to a low potential, i.e., the flip-flop 130 switches to its "0" state. Thus, in response to each chronized pulse received on the terminal 26 and passed through the gate 128, the flip-flop device 130 will be set to its "0" state and the relatively low potential at the conductor 146 will be transferred through the R–C delay circuit 131 to place the second control grid 125b below its cut-off potential, thereby closing the gate 125. As shown in FIG. 11, a time delay $\tau_1$ occurs between the drop at 230a in the flip-flop output potential and the closing of the gate 125 at 231a.

The next master pulse (221a, FIG. 11) appearing on the line 20 cannot pass through the gate tube 125, and will not appear on the output terminal 29. However, the master pulse which fails to pass through the gate 125 also appears, in a negative-going sense (222a, FIG. 11) on the line 22 which leads through a capacitor 160 and a diode 161 to the control grid 158a of the discharge device 158 (FIG. 7). Thus, that master pulse appearing on the line 22 will drive the discharge tube 159 to cut-off and, by virtue of the cross connections between the anodes and control electrodes, will switch the flip-flop 130 to its "1" state, abruptly increasing the potential (see 230b FIG. 11) of output line 146. After a time delay $\tau_2$ created by the element 131, the potential at the control electrode 125b rises to open the gate 125 (see 231b, FIG. 11).

The pulses which appear ultimately on the add-delete output terminal 29 are represented at 232 in FIG. 11. It will be seen that these include one pulse 232a for each of the master pulses 221, except that one pulse is missing at 232b for each of the information pulses 220.

The purpose of the delay element 131 is to make certain that the gate 125 is not opened in response to a master pulse appearing on the line 22 before the same master pulse appearing on the line 20 has been blocked by the closed gate. The element 131 thus need produce only a very short delay between changes in potential of the line 146 and corresponding changes of potential at the control electrode 125b.

*Sign selection*

Referring now to FIG. 3, an exemplary arrangement for the sign selection control 129, as represented in block form by FIG. 2, is there shown in detail. It will be apparent that the terminals 144 and 145 appearing in FIG. 7 also appear in FIG. 3 as relay contacts engageable by a double-throw switch blade 165 moved to its lower position in response to energization of the relay coil 166. With the coil 166 de-energized and the blade 165 in the upper position illustrated, connection is established from a sign voltage source 168 to the terminal 144, placing the latter at ground potential or above, and thus raising the potential of the control electrode 126b in the gate tube 126 (FIG. 7) above the cut-off value so that the gate tube will pass pulses supplied to its first control grid 126a. On the other hand, if a circuit leading to an appropriate voltage source over the relay control line 169 is completed, and the relay 166 energized to position the switch blade 165 in contact with the terminal 145, then the gate 126 will be closed because of the connection of the control electrode 126b to a negative biasing source (FIG. 7) while the gate 128 will be opened by virtue of connection of the voltage source 168 through the terminal 145 placing the control electrode 128b above cut-off potential. While the information pulses received on the input terminal 11 do not carry sign as well as magnitude information, it is possible to obtain either positive or negative analogue variations by de-energizing or energizing the relay coil 166. When the relay coil is de-energized, operation in the "add" mode occurs, while if the relay coil 166 is energized, operation in the "delete" mode occurs. As will be explained, this changes the sense of the analogue variation which is ultimately produced by the decoder.

*Modifications*

Certain other minor variations in the decoder organization are also illustrated by FIG. 3. For example, in the chronizer 25B illustrated by FIG. 3, the delay means 45 takes the form of a "delay multivibrator," 45B, as known in the art as a "one-shot" or "monostable" multivibrator. It is contemplated within the invention that any suitable delay means may be employed in the chronizer, and a monostable multivibrator, which performs substantially the same function as the phantastron delay circuit previously described, may be used in certain applications.

FIG. 3 also illustrates a variation in the add-delete means which consists of locating the delay element 131 shown in FIGS. 2 and 7 at a different point in the circuitry. FIGS. 2 and 7 show the delay element 131 interposed between the output line of the flip-flop 130 and the gate 125 controlled thereby. This assures that when the flip-flop 130 is triggered from the "0" to the "1" state by a master pulse appearing on the line 22, the change in potential will not be received at the gate 125 to open the latter until sufficient time has elapsed to make certain that the same master pulse received on the line 20 cannot pass through the gate. As illustrated in FIG. 3, this same result may be obtained by locating a delay element 131A between the master pulse line 22 and the input to the flip-flop 130. This results in master pulses appearing on the line 22 being delayed for a very short interval before they can reach the flip-flop 130 and re-set the latter from the "0" to the "1" state. As soon as the flip-flop 130 is set to the "1" state, the gate 125 is opened, but by this time the same master pulse appearing on the line 20 has been positively blocked by the closed gate.

THE SCALING CHANNELS

It will be understood from the foregoing that the chronizer 25, the add-delete means 28 and the master pulse source 16 (FIG. 2) function to provide (a) a string of master pulses on the line 24 and (b) a stream of pulses at the terminal 29 which contains either the sum or the difference of the master pulses and information pulses. In accordance with the invention means are provided to equally divide in frequency this master pulse string and pulse stream to obtain a recurring reference waveform and a recurring control waveform which shifts in phase relative to the reference.

As here shown (FIGS. 1 and 2), such equal frequency division is obtained by the reference scaling channel 34 and the identical control scaling channel 35, each of which comprises a plurality of bi-state devices 170, 171 connected in tandem relation. Stated in different words, the scaling channels 34 and 35 respectively include first and second counters, with the two counters having equal dividing or scaling ratios. While the bi-state devices themselves may take a variety of forms such as magnetic cores or relays, they are here illustrated as tandemly connected flip-flop circuits. In the present instance each of the scaling channels 34, 35 includes eight tandemly connected flip-flop circuits giving a total dividing ratio of 256 or an output waveform having 1/256 the frequency of the input impulses. It will be understood however, that any number of tandemly connected flip-flops may be employed.

Referring to FIG. 8, a detailed schematic diagram of two of the flip-flops 171 is there shown which will serve to make clear the complete organization of both scaling channels 34 and 35. These flip-flops are organized and operate in substantially the same manner as the flip-flop 40 previously described in connection with FIG. 4, except that they are arranged and connected to be switched from either state to the other in response to a negative input pulse. Each includes two cross-connected discharge devices 175, 176, an output terminal 178 being located between the anode load resistors for the second discharge device. To connect the flip-flops 171 in tandem relation, differentiating and clipping means are employed. Such means as here shown take the form of a differentiating circuit 179 interposed between the output terminal 178 of each flip-flop and an input terminal 180 of the succeeding flip-flop. The clipping means take the form of a diode 181 in each flip-flop which is conductive only for negative-going pulses appearing on the input terminals, such diodes leading to both of the discharge device control electrodes through respective diodes 182, 184. Whenever a negative pulse is received on the input terminal of each flip-flop, the diode 181 will conduct, and current will flow through the particular one of the diodes 182, 184 which is connected to the control electrode of that particular discharge device 175 or 176 which at that time is conducting. Both tubes 175 and 176 will be cut off for the duration of the input pulse, and at the termination of the input pulse the cross-coupling capacitors will place a higher potential on the control grid of the previously non-conducting tube. The previously non-conducting tube will thus start conducting, and through the cross-coupling will hold the previously conducting tube cut-off. Thus, each negative pulse will serve to switch the flip-flop circuit from the one state to the other.

As previously explained, the master pulse string, appearing on the line 24 (FIG. 2) and represented at 202 in FIG. 9, is supplied to the reference scaling channel 34. The waveform 211 in FIG. 9 represents the potential variation at the output terminal 178 of the first flip-flop 170 in the scaling channel 34. It will be seen that this waveform is a recurring square wave of one-half the frequency of the master pulses 202.

On the other hand, the pulse stream, appearing on the terminal 29 (FIG. 2) represented at 210 in FIG. 9, is supplied as the input signal to the control scaling channel 35. The output wave form of the first flip-flop 171 in the scaling channel 35 is graphically represented at 212 in FIG. 9. It will be seen that the potential output of the first flip-flop in the control scaling channel will switch from one value to another each time that one of the pulses 210a occurs, and also each time that one of the pulses 210b occurs. Thus, in response to the first pulse 210b shown in FIG. 9, the first flip-flop in the control scaling channel will switch states as indicated at 212a while the first flip-flop in the reference scaling channel will remain unchanged. Thus, the output waveform of the first flip-flop in the control scaling channel will advance 180° in phase each time that an extra pulse 210b (derived from an information pulse 200 and not supplied to the input of the reference scaling channel) occurs.

*Operation in add mode*

FIG. 10 illustrates the over-all operation of the frequency dividing or scaling channels 34 and 35 in the add mode. The output waveform of the last flip flop in the reference scaling channel 34 is illustrated by the variation 214. With eight flip-flops connected in tandem, it will be seen that the output of the last flip-flop changes between relatively high and low potentials each time that an integral multiple of one hundred twenty-eight master pulses are supplied to the input of the reference channel. Thus, the output waveform changes between its two possible values and at those instants when the 128th, 256th, 384th, 512th, etc., master pulse is received over line 24.

While the above action is taking place, the control scaling channel 35 will be receiving extra pulses which appear in the pulse stream on the terminal 29 in response to each information pulse appearing on the terminal 11. For illustration, it is assumed that some time after 256 master pulses have appeared, an information pulse appears on the input terminal 11, and as a result, an extra pulse 215 (FIG. 10) will appear on the input terminal 29 for the reference scaling channel (FIG. 2). Accordingly, as shown by the output waveform for the control scaling channel at 216 in FIG. 10, the control scaling channel will receive a total of 384 input pulses at an instant $I_1$ which occurs before the instant $I_2$ at which the reference scaling channel has received 384 input pulses. In other words, the count registered in the control scaling channel or counter is increased by a predetermined abount (here, one) for each information pulse of the positive or "add" polarity. Therefore, as illustrated by the waveform 216 in FIG. 10, the output waveform of the control scaling channel will switch from a relatively low to a relatively high value at the instant $I_1$, while that same transition will occur for the output waveform of the reference scaling channel at a later instant $I_2$. As a result of the extra pulse 215, therefore, the phase of the recurring waveform 216 is advanced by a predetermined amount $\Delta\phi 1$ relative to the reference wave 214.

The phase of the two waveforms 214, 216 will then remain constant so long as they continue to receive the same number of pulses, i.e., the master pulses. Thus, at a time instant $I_3$, the control waveform will switch from a relatively low to a relatively high value, while at a later instant $I_4$, the reference waveform 214 will make the same transition. This arises from the fact that the extra pulse 215 which has been previously received results in the control scaling channel receiving a total of 640 input pulses before the reference scaling channel receives 640 input pulses. In fact, at the instant that the reference scaling channel does receive the 640th input pulse, then the control scaling channel is receiving its 641st input pulse. Thus as illustrated at the time instants $I_3$ and $I_4$ in FIG. 10, the advanced phase of the control channel output waveform 216 is maintained relative to the reference channel waveform 214.

If at a later time, a second extra pulse 218 occurs in the stream of pulses supplied over the terminal 29 to the control scaling channel 35 (FIG. 2), then the latter channel will receive its 896th input pulse at a time instant $I_5$ which occurs earlier than a time instant $I_6$ required for the reference scaling channel to receive two additional master pulses and bring the total received to 896. Thus, FIG. 10 makes it clear that after two extra pulses have been received in the pulse stream on the terminal 29, the phase of the control channel output waveform will be advanced by two increments $\Delta\phi 2$ relative to the output waveform 214 of the reference scaling channel.

If sometime after the reference scaling channel has received a total of 1152 master pulses, and the control scaling channel has received 1154 input pulses (owing to the two previous extra information pulses 215, 218) a third information pulse 219 is received, then the total pulses fed to the control channel will reach a value of 1280 at an instant $I_7$ which occurs earlier in time and an instant $I_8$ when the reference scaling channel receives a total of 1280 input pulses. The control scaling channel output wave 216 will switch from a high to a low value at the instant $I_7$ before the corresponding change occurs in the reference channel output wave at the instant $I_8$; the waveform 216 will thus lead the waveform 214 by three phase increments $\Delta\phi 3$ corresponding to the three information pulses 215, 218, and 219 which have occurred.

It is to be understood that the incremental phase advance of the control waveform 216 relative to the reference waveform 214 produced by each information pulse may be made very small so that in practical effect it is the same as a smooth phase variation. In the present case where eight tandemly connected bi-state devices are employed in each scaling channel, the phase of the control waveform will shift a full 360° relative to the reference waveform in response to 256 information pulses. Thus, each information pulse will produce an incremental phase shift of approximately 1.41°. However, by employing a greater number of tandemly connected flip-flops, then the incremental phase shift produced by each information pulse will be correspondingly reduced in magnitude.

The phase of the control waveform and the reference waveform will shift through 360° several times as great numbers of information pulses are received, so that the phase only to the nearest 360° will be measurable. However, it is possible to integrate or count the number of complete 360° phase laps that occur so that the total phase shift represented by a great number of received information pulses can be utilized.

*Operation in the delete mode*

FIG. 11 illustrates, by the several pulse trains or waveforms shown therein, the operation of the decoder shown by FIG. 2 in the "delete mode." The pulse trains or waveforms 220 through 229 illustrated in FIG. 11 are identical with the corresponding pulse trains and waveforms illustrated at 200 through 209 in FIG. 9 since the operation of the chronizer is the same in both the add and delete modes.

The master pulse string 222 is supplied over the line 24 to the input of the reference scaling channel 34 (FIG. 2), while the pulse stream 232, containing one less pulse than the master string for each information pulse, is fed over the terminal 29 to the input of the control scaling channel 35. Thus, each time that an information pulse of the negative or delete polarity is introduced, the count registered by the control channel or counter will be decreased by a predetermined or particular amount; in the illustrated arrangement the control channel 35 will receive one less pulse than the reference channel 34, so that the output wave of the former will be retarded a discrete amount in phase relative to the output wave of the latter.

FIG. 12 illustrates the manner in which the output waveforms of the reference and control scaling channels 34 and 35 vary in the delete mode of operation. A square wave output 238 (FIG. 12) is produced by the reference scaling channel 34 and appears on the output terminal 14 (FIG. 2). This waveform 238 changes from one level to another each time that an integral multiple of 128 master pulses are received by the reference scaling channel. In a similar manner, the waveform 239 in FIG. 12 represents the output variation of the control scaling channel appearing on the terminal 15 when the decoder is operating in the delete mode.

It will be seen from FIG. 12 that the two waveforms are identical and have fixed phase relation so long as no information pulses are received. Thus, both the waveforms 238 and 239 will change from a relatively low to a relatively high value after they have received the same number of input pulses, namely, 128 pulses generated by the master pulse source 16. The two will then change in unison from a high value to a low value after they have received 256 input pulses. However, if a pulse 240 is then deleted from the stream appearing on the terminal 29 as a result of an information pulse causing momentary closure of the gate 125 (FIG. 2), the number of input pulses to the control channel 35 will be reduced by one relative to the number of input pulses to the reference channel 34. Therefore, as indicated in FIG. 12 at the instant $I_9$ when the reference scaling channel has received 384 input pulses and switches from a low to a high output potential, the control scaling channel will have received only 383 pulses. When the next master pulse is generated, this brings the total pulses received by the control channel to 384 so that the latter has its output wave switch from a low to a high value. But this ocurs at a later time instant $I_{10}$ and thus causes the phase of the control waveform 239 to be retarded by a predetermined amount $\Delta\phi 1$ relative to the waveform 238.

The two scaling channels 34 and 35 then continue to scale with a constant phase relation between their output waveforms since they continue to receive the same number of pulses generated by the master pulse source 16. It will be seen that at the time instant $I_{11}$ when the reference scaling channel has received a total of 512 pulses, the control scaling channel will have received 511 pulses, so that the control channel output voltage does not switch from a high to a low value until a later time instant $I_{12}$.

If it is assumed that a second information pulse occurs after both of the scaling channels have received something in excess of 768 input pulses, so that a pulse 241 is deleted from the stream of pulses supplied to the control scaling channel, then at the time instant $I_{13}$ when the reference scaling channel has received a total of 896 input pulses and its output wave switches from a relatively low to a high value, the control channel will have received only 894 pulses, i.e., a total of two less than the reference channel. Thus, the output waveform of the control channel will not switch from a low to a high value at the instant $I_{13}$ but will do so at a later instant $I_{14}$, after two additional master pulses have been generated. Thus, at the instant $I_{14}$ the control channel has received 896 input pulses and its output potential switches from a relatively low to a relatively high value. Therefore, in response to two information pulses which cause two fewer input pulses to the control channel, the phase of the control channel output waveform is retarded by two incremental amounts $\Delta\phi 2$ relative to the output waveform of the reference channel.

Finally, as illustrated in FIG. 12, if a third information pulse is received and thus causes blocking of a third pulse 242 from the control channel 35, the reference scaling channel will receive a total of 1280 input pulses at an instant $I_{15}$ when the control channel has received a total of 1277 input pulses. Thus, while the reference output waveform 238 switches from a high to a low value at the instant $I_{15}$, the control channel output waveform 239 will not correspondingly switch until a later time instant $I_{16}$ which occurs after three more master pulses have been generated to bring the total number of pulses received by the control channel to 1280.

The foregoing explanation shows that by supplying any number of information pulses to the decoder operating in the delete mode, the phase of the control output wave 239 will be correspondingly retarded by small increments relative to the reference channel output waveform 238.

Since merely by supplying sign-selecting potentials from the sign selection control 129 (FIG. 2), the decoder may be changed from the "add" to the "delete" mode at will, the present decoder will provide an analogue output signal which varies not only in magnitude but also in a sense which corresponds to information input. The information pulses applied to the terminal 11 represent in digital form the magnitude of variation desired, while the condition of the sign selection control means 129 represents the sign or sense of the desired variation. If operation is changed from the add to the delete mode, or vice versa, frequently, the phase of the output signals appearing on the terminals 14 and 15 will represent the algebraic sum of the information pulses which have up to that instant been supplied to the decoder.

Two recurring square wave signals which shift in phase relative to one another, such as is illustrated in FIGS. 10 and 12 may be utilized by several different kinds of equipment well known to those skilled in the art for control purposes. Because the actual control circuitry and utilization devices form no part of the present invention, they have not been illustrated nor described. As one example, however, the two waveforms may be fed to servo controls to correspondingly vary the sense, extent, and speed of rotation of electric motors which drive movable elements. A variety of other ways in which the phase shifted output signals of the present decoder may be utilized will readily suggest themselves to those skilled in the art.

We claim as our invention:

1. A chronizer for producing, from a series of successive signals and a string of signals, a chain of successive signals equal in number to the said series and each of which is non-coincident with any of the signals in said string, said chronizer comprising, in combination, a gate, means responsive to the occurrence of each signal in said series for opening said gate, means for supplying said string of signals to the input of said gate, means responsive to each signal passed by said gate for closing the latter, and means for producing in response to each signal passed by said gate a signal in said chain which is delayed a predetermined time interval from the passed signal, so that there is one signal in said chain for each signal in said series and which is non-coincident with any signal in said string.

2. A chronizer for producing, from a series of time-spaced pulses and a string of time-spaced pulses, a chain of pulses equal in number to those in said series and in which each pulse is non-coincident with any pulse in said string, said chronizer comprising, in combination, a bi-state device settable to either a "1" or a "0" state, a gate connected with and controlled by said bi-state device to be opened and closed when the bi-state device is in the "1" and "0" states, respectively, means for supplying each pulse in said series to said bi-state device to set the latter in the "1" state, means for supplying the pulses in said string to the input of said gate, means responsive to each pulse passed by said gate for producing a pulse in said chain which is delayed a predetermined time interval from the passed pulse, and means responsive to each pulse passed by said gate for re-setting said bi-state device to the "0" state before the next pulse in said string occurs.

3. A chronizer for producing, from a series of pulses and a string of pulses, a chain of pulses equal in number to the pulses in said series but non-coincident with the pulses of said string, said chronizer comprising, in combination, a bi-state device settable to either a "1" or a "0" state, a gate connected with and controlled by said bi-state device to be open and closed when the device is in the "1" and "0" states, respectively, means for supplying each pulse in said series to said bi-state device to set the latter to its "1" state, means for supplying said string of pulses to the input of said gate, means for generating a step wave of predetermined duration in response to each pulse passed by said gate, means responsive to the leading edge of said step wave for resetting said bi-state device to the "0" state, and means responsive to the trailing edge of said step wave for producing a pulse in said chain.

4. A chronizer for producing, from a series of pulses and a string of pulses, a chain of pulses equal in number to the pulses in said series and each of which is non-coincident with any pulse in said string, said chronizer comprising, in combination, a bi-state device settable to either a "1" state or a "0" state, a gate connected with and controlled by said bi-state device to be open and closed when the device is in the "1" and "0" states, respectively, means for causing each pulse in said series to set said bi-state device to the "1" state, means for supplying said string of pulses to the input of said gate, means for causing each pulse passed by said gate to reset said bi-state device to the "0" state, and means responsive to each switching of said bi-state device from the "1" to the "0" state for producing a pulse delayed by a predetermined time interval from the instant of such switching, such delayed pulses constituting said chain.

5. An algebraic combining device for creating a stream of signals which is increased or decreased by one signal from a signal string for each signal appearing in a chain of non-coincident signals, said combining device comprising selectively operable means for adding signals to or deleting signals from said string, said adding means including means receiving said string and chain and passing the signals in both of them to a common output terminal; said deleting means including means receiving the signals in said string and transmitting them to said output terminal, means for disabling said transmitting means in response to the occurrence of each signal in said chain, and means responsive to each signal in said string for restoring said transmitting means after the latter has been disabled.

6. An algebraic combining device for creating a stream of successive pulses which contains either the sum of or the difference between the pulses of a pulse string and a chain of non-coincident pulses, said combining device comprising, in combination, means for normally passing said pulses in said string to an output terminal, selectively operable means for passing pulses in said chain to said output terminal when summation of pulses in said string and chain is desired in said stream, normally inactive means for blocking one pulse in said string from said output terminal, and selectively operable means for actuating said blocking means in response to each pulse in said chain when the difference between pulses in said string and chain is desired in said stream.

7. An algebraic combining device for creating a stream of pulses which contains one more or one less pulse than a string of pulses for each pulse appearing in a pulse chain, said combining device comprising, in combination, a first gate receiving said pulse string, second and third gates each receiving as inputs said pulse chain, means for sending pulses passed by said first and second gates to a common output terminal, a bi-state device settable to either a "1" or "0" state, means connecting said bi-state device to open and close said first gate when the device is in the "1" and "0" states, respectively, means for causing pulses passed by said third gate to set said bi-state device to the "0" state, means for causing each pulse in said string to reset said bi-state device to the "1" state after a short delay from the instant that pulse occurs, and means for selectively and complementally opening and closing said second and third gates to cause the pulse stream appearing on said output terminal to contain either the sum or the difference of the pulses in said string and chain.

8. A chronizer for producing from a series of randomly spaced command pulses and a string of recurring master pulses, a chain of pulses equal in number to the command pulses but non-coincident with any of the master pulses, and wherein the shortest period between two successive master pulses, said chronizer comprising a normally closed gate, means responsive to each of said command pulses for opening said gate, means including said gate when the latter is open for creating a path for transmitting said master pulses, means responsive to transmission of one master pulse over said path for reclosing said gate, and means for producing one pulse in said chain upon each reclosure of said gate with such pulse being delayed from the instant of the transmitted master pulse by an interval which is less than the period between two successive master pulses, so that each pulse in said chain corresponds to one command pulse but is time-spaced relative to said master pulses.

9. An algebraic combining device for creating a stream of signals which is increased or decreased by one signal relative to a signal string for each signal appearing in a chain of non-coincident signals, said combining device comprising first means for transmitting said string to a common output terminal, second means for transmitting said chain to said output terminal, third means responsive to each signal in said chain for disabling said first means for a period of time sufficient to block the transmission of one signal in said string to said output terminal, and sign control means for selectively and complementally (a) enabling said second means and disabling said third means so that said string and chain signals additively appear on said output terminal, or (b) enabling said third means and disabling said second means so that said string and chain signals appear subtractively on said output terminal.

10. An algebraic combining device for creating a stream of signals which is increased or decreased by one, relative to a string of recurring master signals, for each command signal appearing in a chain of command signals which are non-coincident with said master signals comprising a common output terminal on which said stream is to appear, a first gate having an input connected to receive said string of master signals and an output coupled to said output terminal, a second gate having an input connected to receive said chain of command signals on output coupled to said output terminal, a bi-state device having set and reset states and connected to close or open said first gate when in the set or reset state, respectively, a third gate having an input connected to receive said command signals and an output connected to a set input terminal of said bi-state device, means for resetting said bi-state device after the latter has been set for a period of time sufficient to cause said first gate to block transmission of one of said master pulses, and add-delete selection means for selectively and complementally (a) opening said second gate and closing said third gate, and (b) closing said second gate and opening said third gate.

11. A chronizer for producing, from a series of randomly spaced command pulses and a string of regularly recurring master pulses, a chain of pulses equal in number to the command pulses but non-coincident with the master pulses, and wherein the shortest period between two successive command pulses is greater than the period between two successive master pulses, said chronizer comprising in combination a bistate device capable of residing in "0" and "1" states, means for coupling each command pulse to said bi-state device to cause the latter to be set to its "1" state, a gate coupled to and controlled by said bistate device to be open or closed when the latter is respectively in its "1" or "0" state, means for supplying said master pulses to the input of said gate, delay means having a delay interval less than the period between two successive master pulses coupled to receive pulses passed by said gate and thus operative to produce one pulse in said chain for each command pulse, and means responsive to each pulse passed by said gate for resetting said bistate device to its "0" state.

12. A chronizer for producing, from a series of randomly spaced command pulses and a string of regularly recurring master pulses, a chain of pulses equal in number to the command pulses but non-coincident with the master pulses, and wherein the shortest period between two successive command pulses is greater than the period between two successive master pulses, said chronizer comprising in combination a bistate device capable of residing in "0" and "1" states, means for coupling each command pulse to said bistate device to cause the latter to be set to its "1" state, a gate coupled to and controlled by said bistate device to be open or closed when the latter is respectively in its "1" or "0" state, means for supplying said master pulses to the input of said gate, means for coupling each pulse passed by said gate to said bistate device to cause the latter to reset to its "0" state, and means responsive to each resetting of said bistate device to its "0" state for producing a pulse in said chain delayed by a predetermined time interval from the instant of resetting, said predetermined interval being less than the period between two successive master pulses.

References Cited
UNITED STATES PATENTS

| | | | |
|---|---|---|---|
| 2,404,047 | 7/1946 | Flory et al. | 328—48 |
| 2,537,427 | 1/1951 | Seid et al. | 318—28 |
| 2,824,228 | 2/1958 | Carmichael | 328—39 |

ARTHUR GAUSS, *Primary Examiner.*

B. P. DAVIS, *Assistant Examiner.*

UNITED STATES PATENT OFFICE
CERTIFICATE OF CORRECTION

Patent No. 3,359,499　　　　　　　　　　December 19, 1967

James O. McDonough et al.

It is hereby certified that error appears in the above numbered patent requiring correction and that the said Letters Patent should read as corrected below.

In the heading to the printed specification, lines 6 and 7, for "Giddings & Lewis Machine Tool Company, Fond du Lac, Wis." read -- Giddings & Lewis, Inc. --.

Signed and sealed this 11th day of February 1969.

(SEAL)
Attest:

Edward M. Fletcher, Jr.　　　　　　　　EDWARD J. BRENNER
Attesting Officer　　　　　　　　　　　Commissioner of Patents